United States Patent [19]

Buell

[11] Patent Number: 4,776,423

[45] Date of Patent: Oct. 11, 1988

[54] MOTORCYCLE CHASSIS WITH UNIPLANAR MOTOR VIBRATION ISOLATION

[76] Inventor: Erik F. Buell, S. 64th W. 31751 Highway X, Mukwonago, Wis. 53149

[21] Appl. No.: 108

[22] Filed: Jan. 2, 1987

[51] Int. Cl.$^4$ .............................................. B62M 7/02
[52] U.S. Cl. .................................................... 180/228
[58] Field of Search ....................... 180/219, 227, 228; 280/281 R

[56] References Cited

U.S. PATENT DOCUMENTS

| | | | |
|---|---|---|---|
| 4,094,375 | 6/1978 | Doncque | 180/219 |
| 4,226,296 | 10/1980 | Higaki | 180/219 |
| 4,421,195 | 12/1983 | Aiba | 180/228 |

FOREIGN PATENT DOCUMENTS 2142591  1/1985  United Kingdom ............... 180/227

Primary Examiner—John A. Pekar
Attorney, Agent, or Firm—Buell, Ziesenheim, Beck & Alstadt

[57] ABSTRACT

A motorcycle frame design featuring a uniplanar isolation system. This is a system for vehicles which have motors that have basically uniplanar vibrations. It provides mounting means which allow the motor to have vertical and longitudinal movement, but prevent lateral motion of the motor and rear suspension unit with respect to the main frame.

13 Claims, 3 Drawing Sheets

MOTORCYCLE CHASSIS WITH UNIPLANAR MOTOR VIBRATION ISOLATION

This invention relates to a motorcycle chassis with uniplanar motor vibration isolation and particularly to a motorcycle chassis having a mounting means which allows a motor that has a basically uniplanar vibration to have vertical and longitudinal movement but to prevent lateral motion of the motor and rear suspension unit with respect to the main frame.

In order to obtain the maximum handling and stability performance, a motorcycle chassis needs to permit minimal deflection by operating loads of the front and rear wheels from their proper alignment. In the past, the use of the motor assembly as a partially stressed member of the frame has been common in rigidly mounted applications. However, when the motor has significant vibration, the chassis designs have either used a rigid mount for the motor with ensuing chassis and rider fatigue or some sort of elastomeric isolaters that do not permit the motor unit to contribute to frame rigidity. In either case, the result is unsatisfactory. In the past, numerous designs of motorcycle frames have been used in which the motor vibration is severe. For example, in certain of the Norton and Harley Davidson designs the motor vibration is so severe that rigidly mounting the motor to form a part of the chassis as a rigid member has been impossible because of the extreme vibration passed through to the rider causing both chassis and rider fatigue. In these cases, the manufacturers have mounted the rear suspension and the motor unit into a separate rigid power train unit which is attached to the main chassis, front suspension and front wheel assembly through very soft elastomeric mounts. These arrangements have reduced vibration input for the chassis and the rider as well as maintaining integrity of the power train unit to transmit driving forces between the motor and the rear wheel. However, due to the elastic connections between the rear wheel and the front wheel, these designs have suffered significantly in both handling and stability because the rear wheel plane can be deflected from the plane of the front wheel in the Z axis. A chassis which will provide isolation of the rider and main chassis from the motor vibration and still allow the motor to be used as a stressed member of the frame to resist all of X-Z and Y-Z plane deflections would be a significant advance in the state of the art and a highly desirable improvement in the state of chassis design and development.

The chassis of the present invention does provide precisely those significant improvements. The invention can be embodied in several different design configurations. It can, for example, be embodied in a double loop type frame, a single backbone double loop frame or in a geodesic type frame such as that described in my copending application filed herewith. The structure of the present invention completely isolates the motor and frame in such a fashion that the motor may have vertical and longitudinal movement in a vertical plane through the chassis but is prevented from any lateral motion of the motor and rear suspension with respect to the main frame.

I provide a motorcycle chassis with uniplanar motor vibration isolation comprising at least one generally horizontal top frame member, a steering fork assembly at one end of said member, a pair of dependent arms at the other end of said member, at least one dependent member intermediate the fork assembly and said pair of dependent members, a motor and rear suspension assembly or swing arm assembly pivotally connected together on a pivot member, said pivot member being connected to said pair of dependent arms adjacent their ends remote from said top frame member, resilient insulators between said pivot member and arms permitting movement of the pivot member and motor and rear suspension in a vertical plane between said arms, a resilient insulator connector between the at least one member adjacent its front and a point adjacent the top of the motor at the end opposite its pivot with the rear suspension, permitting movement in said vertical plane, at least three tie links between the frame and chassis selected from the following four defined links, a first tie link from said at least one dependent member to said motor adjacent said resilient insulator connection, a second tie link from said at least one dependent member or an extension thereof at the end adjacent the steering fork assembly to said motor adjacent the bottom of the motor, a third tie link from a point intermediate on the length of said top frame member to the top of the motor and a fourth tie link from one of said pair of dependent arms to the bottom of the motor at the end adjacent its pivot with the rear suspension whereby the motor and suspension unit may move in a vertical plane between the dependent arms but is restricted against any movement transverse to said plane. Any third or fourth link must not be in line with a line between any other two links. Preferably the distance between the third or fourth link and a line through any other two links should be as large as possible. I use all four of the defined tie tinks defined above for maximum control of uniplanar motion. Preferably, the chassis is made in a double loop format or in the geodesic format illustrated in my copending application. The motor unit preferably combines the pistons, valves and entire gear train and transmission in a single unit which is pivotally connected to the rear suspension arm. The preferred chassis also embodies a further improvement in isolating motor vibrations from the chassis, in that the rear suspension spring and damper unit (or shock absorber) is connected between the motor and swingarm. In prior designs using a motor and swingarm assembly isolated from the main chassis (Harley-Davidson and Norton), the shock absorbers were connected between the swingarm and main chassis. This allowed some vibrations to be transmitted from the motor/swing arm assembly to the main chassis (and rider) through the shock absorbers.

In the foregoing general description of this invention I have set out certain objects, purposes and advantages of this invention. Other objects, purposes and advantages of this invention will be apparent from a consideration of the following description and accompanying drawings in which.

Figure 1:
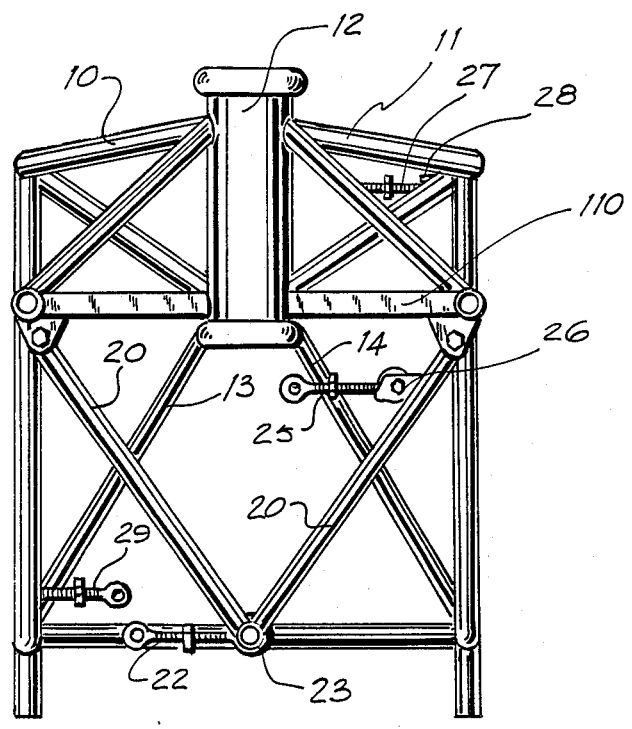
FIG. 1 is a front plan view of a geodesic type frame incorporating the invention.

Referring to the drawings, I have illustrated a geodesic frame such as described in my copending application filed herewith, having a pair of generally horizontally extending member 10, 11, a steering fork assembly housing 12 at one end and two pairs of depending arms 13 and 14 adjacent the other end. Adjacent the depending ends of arms 13 and 14, there are provided resilient mounting members 15 adapted to receive the opposite ends of a pivot arm 16 which connects motor and gear train housing 17 with a rear suspension assembly 18. A front suspension bracket 19 is attached to the top front end of the motor housing. A pair of dependent arms 20 are fixed at one end to the generally horizontal frame member 110 and carry a resilient mounting 21 intermediate their ends, which is adapted to be connected to the bracket 19 at the top front of the motor housing to provide a resilient mounting from the front of the motor. A first tie link 22 is connected at one end to the opposite end 23 of dependent arms 20. The other end of the link 22 is connected to a boss 24 adjacent the bottom of motor housing 17. A second tie link 25 is connected at one end to one of depending arms 20 at 26. The other end of tie link 25 is connected to the top end of motor housing 17 at opening 19a adjacent bracket 19. A third tie link 27 is connected at one end to horizontal frame member 11 at 28 intermediate the ends of frame member 11. The other end of tie link 27 is connected to the top rear of motor housing 17 at flange 28. A fourth tie link 29 is connected at one end to dependent arms 13, 14 at pivot link 30 adjacent the resilient mounting 15. The other end of the link 29 connects to the rear of motor and gear housing 17 at boss 31. The four tie links permit the motor and gear housing 17 and rear suspension 18 to move horizontally and vertically in a vertical plane generally centrally of the chassis but prevent any transverse motion of the motor and gear housing and rear suspension relative to that vertical plane. This completely eliminates the undesirable and annoying vibrations of the motor from reaching the motorcycle chassis and rider because all motion of the motor is restricted to a single plane.

Figure 3:
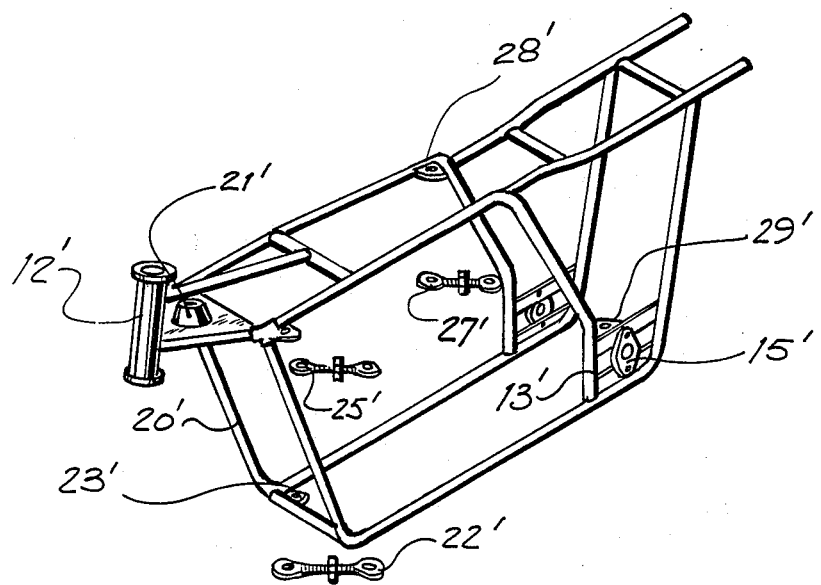
FIG. 3 is an isometric view of the invention incorporated in a double loop type frame.
Figure 2:
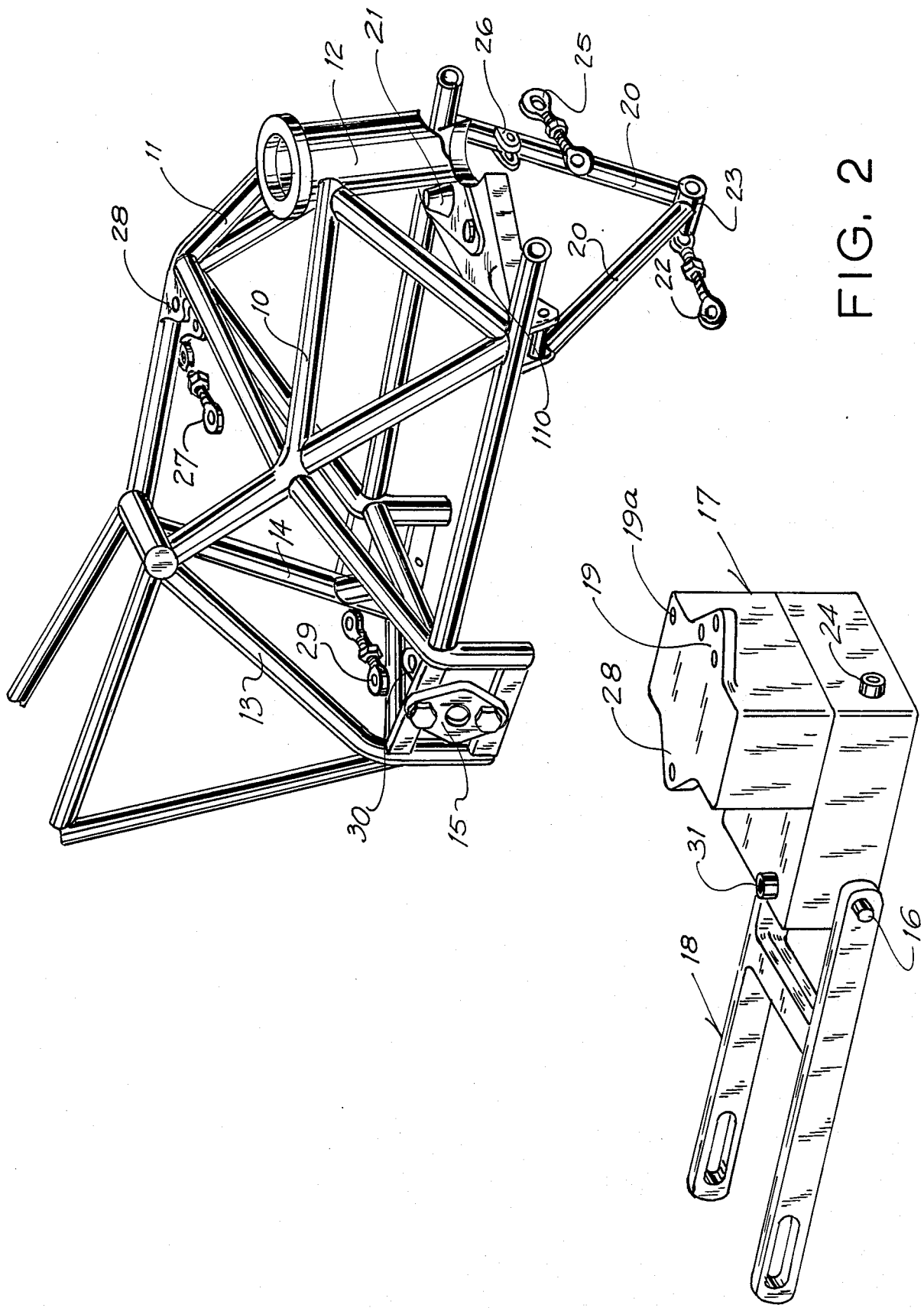
FIG. 2 is an isometric view, partly exploded, of the invention of FIG. 1 showing the motor in plane.

This same structure can be used in a standard double loop frame as illustrated in FIG. 3 where identical parts to those of FIGS. 1 and 2 bear identical numbers with a prime sign.

Figure 4:
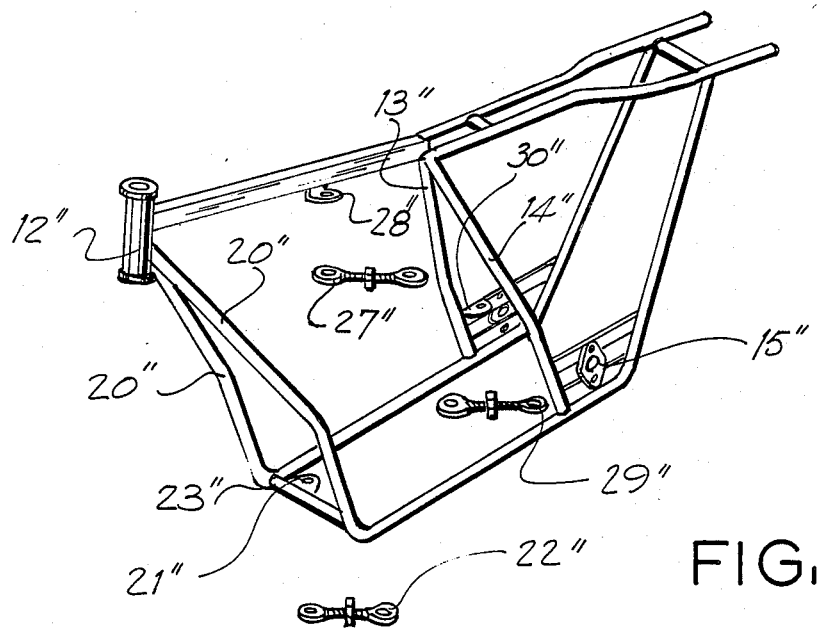
FIG. 4 is an isometric view of a third embodiment of the invention in a single backbone chassis.

In essentially the same way, the structure of this invention can be used in a standard single backbone, modified double loop frame as illustrated in FIG. 4 where like parts to those of FIGS. 1 and 2 bear identical numbers with a double prime sign.

Each of the four tie links 22, 25, 27 and 29 is preferably adjustable in length.

Figure 5:
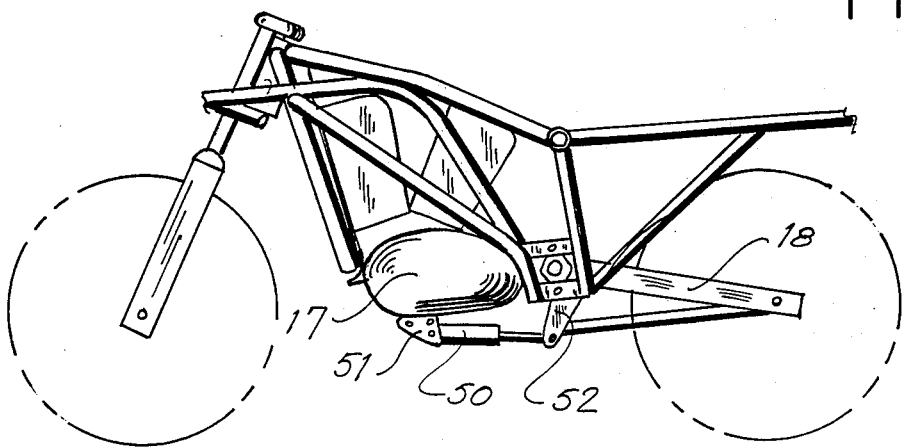
FIG. 5 is a fragmentary side elevational view of a frame showing a preferred shock absorber mounting.

Referring to FIG. 5 I have illustrated a frame such as that of FIGS. 1 and 4 having a shock absorber 50 connected at one end to a boss 51 on the motor housing 17 bottom and at the other end to a link 52 on the swing arm or rear suspension assembly 18.

Figure 6:
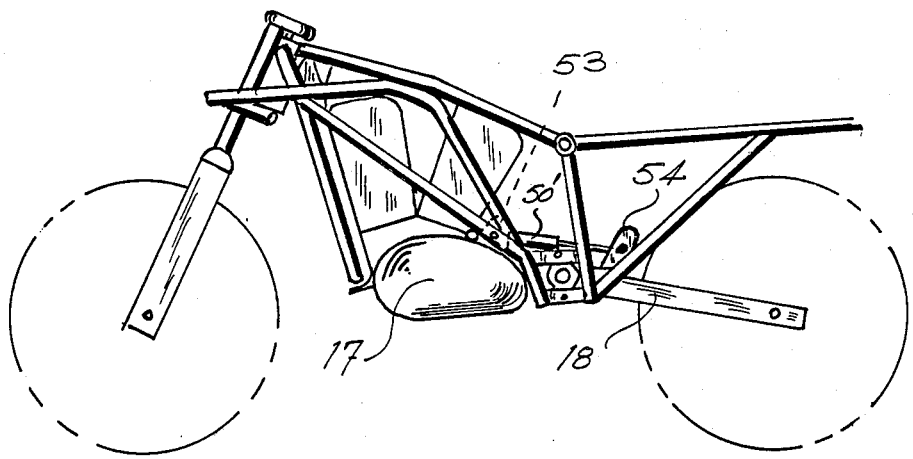
FIG. 6 is another embodiment of shock absorber mounting.

In FIG. 6 I have illustrated a frame such as that of FIGS. 1 through 4 having a shock absorber 50' connected at one end to a boss 53 on the motor housing 17 and at the other end to a link 54 extending upwardly from the swing arm or rear suspension assembly 18.

In the foregoing specification I have set out certain preferred practices and embodiments of this invention, however, it will be understood that this invention may be otherwise embodied within the scope of the following claims.

I claim:

1. A motorcycle chassis with uniplanar motor vibration isolation comprising at least one generally horizontal top frame member, a steering fork assembly at one end of said member, a pair of dependent arms at the other end of said member, at least one dependent member intermediate the fork assembly and said pair of dependent members, a motor and rear suspension arm pivotally connected together on a pivot member, said pivot member being connected to said pair of dependent arms adjacent their ends remote from said top frame member, resilient insulators between said pivot member and arms permitting movement in a vertical plane between said arms, a resilient insulator connector between the at least one member intermediate its length and a point adjacent the top of the motor at the end opposite its pivot with the rear suspension, permitting movement in said vertical plane, at least three tie links from the group consisting of a first tie link from said at least one dependent member to said motor adjacent said resilient insulator connection, a second tie link from said at least one dependent member to said motor adjacent the bottom of the motor, a third tie link from said top frame member to the top of the motor at the end adjacent its pivot with the rear suspension and a fourth tie link from one of said pair of dependent arms to the bottom of the motor at the end adjacent its pivot with the rear suspension whereby the motor and suspension unit may move in a vertical plane between the dependent arms but is restricted against any movement transverse to said plane.

2. A motorcycle chassis with uniplanar motor vibration isolation as claimed in claim 1 having a damper unit connected between the motor housing and the rear suspension assembly acting to absorb or damp road surface shocks on the rear suspension assembly.

3. A motorcycle chassis with uniplanar motor vibration isolation as claimed in claim 1 or 2 wherein said first, third and fourth tie links are utilized.

4. A motorcycle chassis with uniplanar motor vibration isolation as claimed in claim 1 or 2 wherein all four tie links are utilized.

5. A motorcycle chassis with uniplanar motor vibration isolation as claimed in claim 1 or 2 wherein the chassis frame is a geodesic frame.

6. A motorcycle chassis with uniplanar motor vibration isolation as claimed in claim 1 or 2 wherein the chassis frame is a double loop frame.

7. A motorcycle chassis with uniplanar motor vibration isolation as claimed in claim 1 or 2 wherein the chassis frame is a single backbone frame.

8. A motorcycle chassis with uniplanar motor vibration isolation as claimed in claim 5 wherein said first, third and fourth tie links are utilized.

9. A motorcycle chassis with uniplanar motor vibration isolation as claimed in claim 5 wherein all four tie links are utilized.

10. A motorcycle chassis with uniplanar motor vibration isolation as claimed in claim 6 wherein said first, third and fourth tie links are utilized.

11. A motorcycle chassis with uniplanar motor vibration isolation as claimed in claim 6 wherein all four tie links are utilized.

12. A motorcycle chassis with uniplanar motor vibration isolation as claimed in claim 7 wherein said first, third and fourth tie links are utilized.

13. A motorcycle chassis with uniplanar motor vibration isolation as claimed in claim 7 wherein all four tie links are utilized.

* * * * *